United States Patent
Tidwell et al.

(10) Patent No.: US 7,861,299 B1
(45) Date of Patent: *Dec. 28, 2010

(54) THREAT DETECTION IN A NETWORK SECURITY SYSTEM

(75) Inventors: Kenny C. Tidwell, Los Altos, CA (US); Kumar Saurabh, Daly City, CA (US); Debabrata Dash, Sunnyvale, CA (US); Hugh S. Njemanze, Los Altos, CA (US); Pravin S. Kothari, San Jose, CA (US)

(73) Assignee: ArcSight, Inc., Cupertino, CA (US)

( * ) Notice: Subject to any disclaimer, the term of this patent is extended or adjusted under 35 U.S.C. 154(b) by 417 days.

This patent is subject to a terminal disclaimer.

(21) Appl. No.: 11/836,251

(22) Filed: Aug. 9, 2007

Related U.S. Application Data

(63) Continuation of application No. 10/655,062, filed on Sep. 3, 2003, now Pat. No. 7,260,844.

(51) Int. Cl.
 *G06F 11/00* (2006.01)
(52) U.S. Cl. .............................. 726/22; 726/23; 726/25
(58) Field of Classification Search ............ 726/22–26; 709/223–225; 713/188
See application file for complete search history.

(56) References Cited

U.S. PATENT DOCUMENTS

| 5,557,742 | A | 9/1996 | Smaha et al. |
|---|---|---|---|
| 5,717,919 | A | 2/1998 | Kodavalla et al. |
| 5,850,516 | A | 12/1998 | Schneier |
| 5,956,404 | A | 9/1999 | Schneier et al. |
| 5,978,475 | A | 11/1999 | Schneier et al. |
| 6,070,244 | A | 5/2000 | Orchier et al. |
| 6,088,804 | A | 7/2000 | Hill et al. |
| 6,134,664 | A | 10/2000 | Walker |

(Continued)

FOREIGN PATENT DOCUMENTS

WO    WO 02/45315 A2    6/2002

(Continued)

OTHER PUBLICATIONS

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

(Continued)

*Primary Examiner*—Hosuk Song
(74) *Attorney, Agent, or Firm*—Fenwick & West LLP

(57) ABSTRACT

A network security system is provided that receives information from various sensors and can analyze the received information. In one embodiment of the present invention, such a system receives a security event from a software agent. The received security event includes a target address and an event signature, as generated by the software agent. The event signature can be used to determine a set of vulnerabilities exploited by the received security event, and the target address can be used to identify a target asset within the network. By accessing a model of the target asset, a set of vulnerabilities exposed by the target asset can be retrieved. Then, a threat can be detected by comparing the set of vulnerabilities exploited by the security event to the set of vulnerabilities exposed by the target asset.

29 Claims, 2 Drawing Sheets

U.S. PATENT DOCUMENTS

| | | | |
|---|---|---|---|
| 6,192,034 B1 | 2/2001 | Hsieh et al. | |
| 6,275,942 B1 | 8/2001 | Bernhard et al. | |
| 6,321,338 B1 | 11/2001 | Porras et al. | |
| 6,324,656 B1 * | 11/2001 | Gleichauf et al. | 714/37 |
| 6,408,391 B1 | 6/2002 | Huff et al. | |
| 6,408,404 B1 | 6/2002 | Ladwig | |
| 6,484,203 B1 | 11/2002 | Porras et al. | |
| 6,542,075 B2 | 4/2003 | Barker et al. | |
| 6,694,362 B1 | 2/2004 | Secor et al. | |
| 6,704,874 B1 | 3/2004 | Porras et al. | |
| 6,708,212 B2 | 3/2004 | Porras et al. | |
| 6,711,615 B2 | 3/2004 | Porras et al. | |
| 6,839,850 B1 | 1/2005 | Campbell et al. | |
| 6,928,556 B2 | 8/2005 | Black et al. | |
| 6,952,779 B1 * | 10/2005 | Cohen et al. | 726/22 |
| 6,966,015 B2 | 11/2005 | Steinberg et al. | |
| 6,985,920 B2 | 1/2006 | Bhattacharya et al. | |
| 6,988,208 B2 | 1/2006 | Hrabik et al. | |
| 7,039,953 B2 | 5/2006 | Black et al. | |
| 7,043,727 B2 | 5/2006 | Bennett et al. | |
| 7,089,428 B2 | 8/2006 | Farley et al. | |
| 7,127,743 B1 | 10/2006 | Khanolkar et al. | |
| 7,159,237 B2 | 1/2007 | Schneier et al. | |
| 7,171,689 B2 | 1/2007 | Beavers | |
| 7,219,239 B1 | 5/2007 | Njemanze et al. | |
| 7,260,844 B1 | 8/2007 | Tidwell et al. | |
| 7,278,160 B2 | 10/2007 | Black et al. | |
| 7,308,689 B2 | 12/2007 | Black et al. | |
| 7,333,999 B1 | 2/2008 | Njemanze | |
| 7,376,969 B1 | 5/2008 | Njemanze et al. | |
| 7,483,972 B2 | 1/2009 | Bhattacharya et al. | |
| 7,644,365 B2 | 1/2010 | Bhattacharya et al. | |
| 2002/0019945 A1 | 2/2002 | Houston et al. | |
| 2002/0099958 A1 | 7/2002 | Hrabik et al. | |
| 2002/0104014 A1 | 8/2002 | Zobel et al. | |
| 2002/0147803 A1 | 10/2002 | Dodd et al. | |
| 2002/0184532 A1 | 12/2002 | Hackenberger et al. | |
| 2003/0084349 A1 | 5/2003 | Friedrichs et al. | |
| 2003/0093514 A1 | 5/2003 | Valdes et al. | |
| 2003/0093692 A1 | 5/2003 | Porras | |
| 2003/0101358 A1 | 5/2003 | Porras et al. | |
| 2003/0188189 A1 | 10/2003 | Desai et al. | |
| 2003/0221123 A1 | 11/2003 | Beavers | |
| 2004/0010718 A1 | 1/2004 | Porras et al. | |
| 2004/0024864 A1 | 2/2004 | Porras et al. | |
| 2004/0044912 A1 | 3/2004 | Connary et al. | |
| 2004/0221191 A1 | 11/2004 | Porras et al. | |
| 2005/0027845 A1 | 2/2005 | Secor et al. | |
| 2005/0204404 A1 | 9/2005 | Hrabik et al. | |
| 2005/0251860 A1 | 11/2005 | Saurabh et al. | |
| 2006/0069956 A1 | 3/2006 | Steinberg et al. | |
| 2006/0095587 A1 | 5/2006 | Bhattacharya et al. | |
| 2006/0212932 A1 | 9/2006 | Patrick et al. | |
| 2007/0118905 A1 | 5/2007 | Morin et al. | |
| 2007/0136437 A1 | 6/2007 | Shankar et al. | |
| 2007/0150579 A1 | 6/2007 | Morin et al. | |
| 2007/0162973 A1 | 7/2007 | Schneier et al. | |
| 2007/0169038 A1 | 7/2007 | Shankar et al. | |
| 2007/0234426 A1 | 10/2007 | Khanolkar et al. | |
| 2007/0260931 A1 | 11/2007 | Aguilar-Macias et al. | |
| 2008/0104046 A1 | 5/2008 | Singla et al. | |
| 2008/0104276 A1 | 5/2008 | Lahoti et al. | |
| 2008/0162592 A1 | 7/2008 | Huang et al. | |
| 2008/0165000 A1 | 7/2008 | Morin et al. | |
| 2010/0058165 A1 | 3/2010 | Bhattacharya et al. | |

FOREIGN PATENT DOCUMENTS

| | | |
|---|---|---|
| WO | WO 02/060117 A1 | 8/2002 |
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |
| WO | WO 2005/001655 | 1/2005 |
| WO | WO 2005/026900 | 3/2005 |

OTHER PUBLICATIONS

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in *SRI International, Inc. v. Internet Security Systems, Inc. and Symantec Corporation* (D. Del., Viv. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.

U.S. Appl. No. 60/405,921, filed Aug. 26, 2002, Gisby et al.

ArcSight, "About ArcSight Team," date unknown, [online] [Retrieved on Oct. 25, 2002] Retrieved from the Internet <URL: http://www.arcsight.com/about_team.htm>.

ArcSight, "About Overview," Oct. 14, 2002, [online] [Retrieved on Apr. 21, 2006] Retrieved from the Internet <URL: http://web.archive.org/web/20021014041614/http://www.arcsight.com/about.htm>.

ArcSight, "Contact Info," date unknown, [online] [Retrieved on Oct. 25, 2002] Retrieved from the Internet <URL: http://www.arcsight.com/contact.htm>.

ArcSight, "Product Info: Product Overview and Architecture," date unknown, [online] [Retrieved on Oct. 25, 2002] Retrieved from the Internet <URL: http://www.arcsight.com/product.htm>.

ArcSight, "Product Info: 360° Intelligence Yields Precision Risk Management," date unknown, [online] [Retrieved on Oct. 25, 2002] Retrieved from the Internet <URL: http://www.arcsight.com/product_info01.htm>.

ArcSight, "Product Info: ArcSight SmartAgents," Oct. 10, 2002, [online] [Retrieved on Apr. 21, 2006] Retrieved from the Internet <URL: http://web.archive.org/web/20021010135236/http://www.arcsight.com/product_info02.htm>.

ArcSight, "Product Info: ArcSight Cross-Device Correlation," date unknown, [online] [Retrieved on Oct. 25, 2005] Retrieved from the Internet <URL: http://www.arcsight.com/product_info03.htm>.

ArcSight, "Product Info: ArcSight Manager," date unknown, [online] [Retrieved on Oct. 25, 2002] Retrieved from the Internet <URL: http://www.arcsight.com/product_info04.htm>.

ArcSight, "Product Info: ArcSight Console," date unknown, [online] [Retrieved on Nov. 15, 2002] Retrieved from the Internet <URL: http:www.arcsight.com/product_info05.htm>.

ArcSight, "Product Info: ArcSight Reporting System," date unknown, [online] [Retrieved on Oct. 25, 2002] Retrieved from the Internet <URL: http:www.arcsight.com/product_info06.htm>.

ArcSight, "Product Info: Enterprise Scaling," date unknown, [online] [Retrieved on Oct. 25, 2002] Retrieved from the Internet <URL: http://www.arcsight.com/product_info07.htm>.

ArcSight, "Security Management for the Enterprise," 2002, [online] [Retrieved on Oct. 25, 2002] Retrieved from the Internet <URL: http:www.arcsight.com/>.

Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.

Derodeff, C. "Got Correlation? Not Without Normalization," 2002, [online] Retrieved from the Internet <URL: http://www.svic.com/papers/pdf/Got-Correlation_rmalization.pdf>.

Cheung, S. et al., "EMERALD Intrusion Incident Report: 601 Message Specification," Aug. 10, 2000, System Design Laboratory, SRI International.

National Institute of Standards and Technology (NIST), "Federal Information Processing Standards Publication (FIPS PUB) 199: Standards for Security Categorization of Federal Information and Information Systems", Feb. 2004.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.

Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.

CERT Coordination Center, "Overview of Attack Trends," 2002, [online] Retrieved from the Internet <URL: http://www.cert.org/archive/pdf/attack_trends.pdf>.

Porras, P.A. et al., "EMERALD: Event Monitoring Enabling Responses to Anomalous Live Disturbances," Oct. 1997, Proceedings of the 20$^{th}$ NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.

National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.

Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/821,459, filed Apr. 9, 2004.
U.S. Appl. No. 10/839,563, filed May 4, 2004.
U.S. Appl. No. 10/976,075, filed Oct. 27, 2004.
U.S. Appl. No. 10/975,962, filed Oct. 27, 2004.
U.S. Appl. No. 10/974,105, filed Oct. 27, 2004.
U.S. Appl. No. 11/029,920, filed Jan. 4, 2005.
U.S. Appl. No. 11/021,601, filed Dec. 23, 2004.
U.S. Appl. No. 11/070,024, filed Mar. 1, 2005.
U.S. Appl. No. 11/740,203, filed Apr. 25, 2007.
U.S. Appl. No. 12/098,322, filed Apr. 4, 2008.
U.S. Appl. No. 11/023,942, filed Dec. 24, 2004, pp. 1-26.

* cited by examiner

THREAT DETECTION IN A NETWORK SECURITY SYSTEM

CROSS-REFERENCE TO RELATED APPLICATION

This application claims the benefit under 35 U.S.C. §120 as a continuation of U.S. patent application Ser. No. 10/655,062, filed on Sep. 3, 2003, entitled "Threat Detection in a Network Security System," which is hereby incorporated by reference in its entirety.

FIELD OF THE INVENTION

The present invention relates to a network security system, and, in particular, to analyzing security events.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, various network security monitor devices have been developed to help uncover attempts by unauthorized persons and/or devices to gain access to computer networks and the information stored therein.

Network security products largely include Intrusion Detection Systems (IDSs), which can be Network or Host based (NIDS and HIDS respectively). Other network security products include firewalls, router logs, and various other event reporting devices. Due to the size of their networks, many enterprises deploy hundreds, or thousands of these products thoughts their networks. Thus, network security personnel are bombarded alarms representing possible security threats. Most enterprises do not have the resources or the qualified personnel to individually attend to all of the received alarms.

SUMMARY OF THE INVENTION

A network security system is provided that receives information from various sensors and can analyze the received information. In one embodiment of the present invention, such a system receives a security event from a software agent. The received security event includes a target address and an event signature, as generated by the software agent. The event signature can be used to determine a set of vulnerabilities exploited by the received security event, and the target address can be used to identify a target asset within the network. By accessing a model of the target asset, a set of vulnerabilities exposed by the target asset can be retrieved. Then, a threat can be detected by comparing the set of vulnerabilities exploited by the security event to the set of vulnerabilities exposed by the target asset.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1:
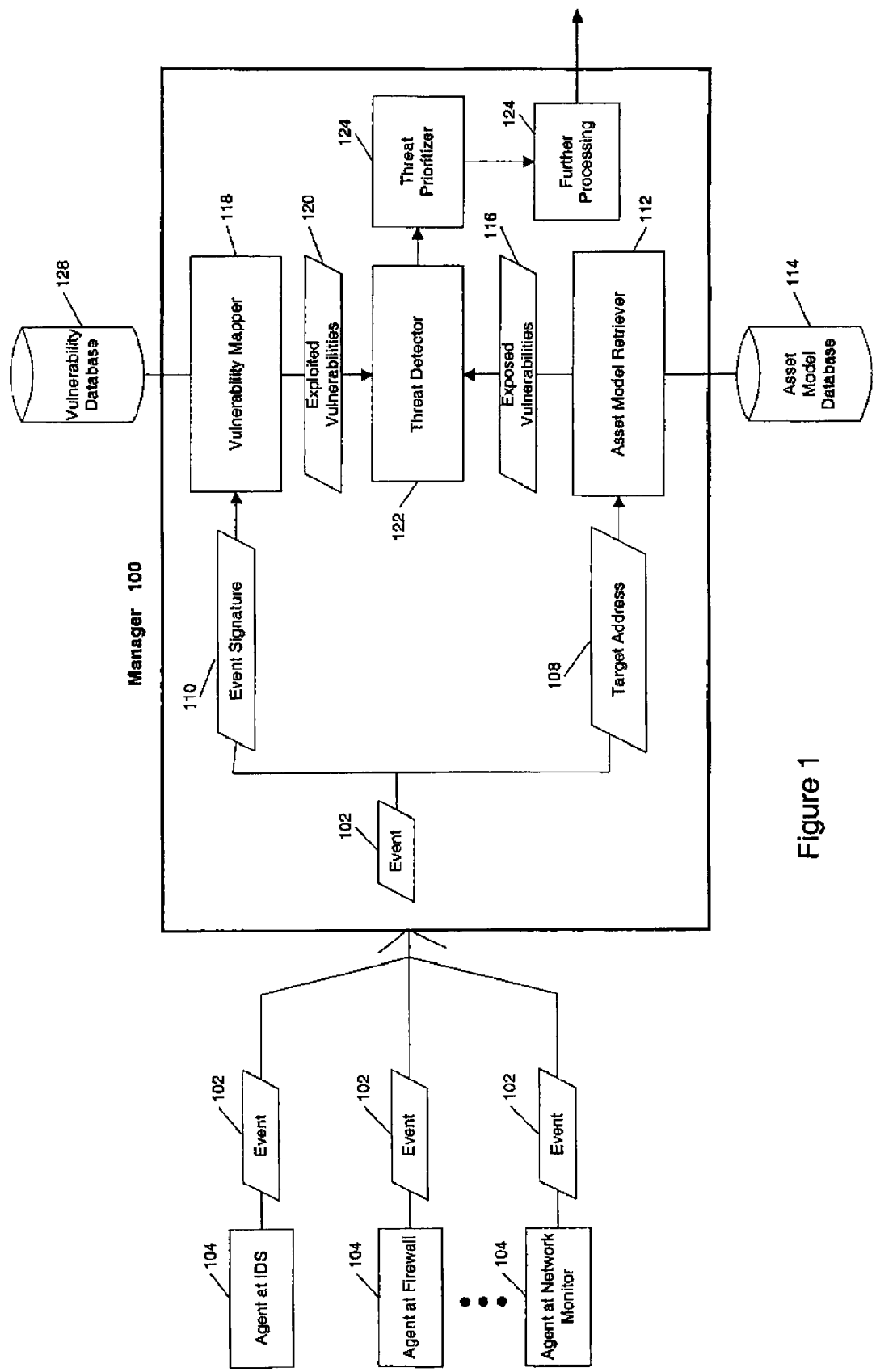
FIG. 1 is a block diagram illustrating one embodiment of a manager module configured in accordance with the present invention.

Described herein is a network security system that can analyze security events being reported on a network.

Although the present system will be discussed with reference to various illustrated examples, these examples should not be read to limit the broader spirit and scope of the present invention. For example, the examples presented herein describe distributed agents, managers and various network devices, which are but one embodiment of the present invention. The general concepts and reach of the present invention are much broader and may extend to any computer-based or network-based security system.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a manager module of a network security system in accordance with an embodiment of the present invention is illustrated. The manager 100 receives security events 102 (also referred to as "events") from various sources. For example, the manager 100 can receive an event 102 from a distributed software agent 104 associated with an IDS, or from the agent 104 associated with a firewall. In one embodiment, the IDS's alarms are normalized by the software agent 104 before being reported as an event 102 to the manager 100.

In formal security terminology, an "event" is an actual physical occurrence—such as a packet traversing the network, or a file being deleted—and an "alarm" is a representation of the "event." As used in this application, however, a security event 102 (or just "event") refers to a representation of a physical phenomenon, thus being an "alarm" according to strict formal terminology. In this application, alarms are produced by a network security device associated with an agent 104—such as an HIDS, a NIDS, or a firewall—and an event 102 refers to the output of the agent 104 after the agent 104 processed, e.g. aggregated, batched, or normalized, the alarms. Furthermore, an unprocessed alarm directly from a sensor device is also considered to be an "event" for the purposes of this application.

An event 102 can have various fields that contain information about the event 102. In one embodiment, the event 102 received by the manager 100 includes the address of the network device—such as a printer, a server, or a terminal—to which the event is directed. This target address 108 can be an Internet Protocol (IP) address, or some other representation of the target device's identity according to some other addressing scheme. In this application, the network devices are also referred to as "assets."

In one embodiment, the event 102 also includes an event signature 110 generated by the agent responsible for the event 102, such as the agent 104 associated with the IDS. Among other information, the event signature 110 can include a field describing the type of the event 102. For example, the event signature 110 can indicate that the event 102 represents a CodeRed attack. The event signature 110 can also have various other fields, including the name and vendor of the security sensor product (e.g. the IDS or firewall).

The target address 108 is then input for an asset model retriever 112 of the manager module 100. The asset model retriever 112 accesses an asset model database 114 to retrieve a model of the target asset being identified by the target address. The model can include various pieces of information about the target asset, such as its IP address, its host name, the network it belongs to, its function in the network, and its exposed vulnerabilities 116. These models of the assets of the enterprise can be generated by hand, or they can be generated automatically, for example, by using vulnerability scanner software such as Nessus.

The exposed vulnerabilities 116 can be a set or list of known vulnerabilities of the target asset. A vulnerability can be generally defined as a configuration or condition of a software or a system that can be exploited to cause an effect other than that intended by the manufacturer. For example, CodeRed exploits a buffer overflow weakness in Microsoft's Internet Information Server (IIS) software. While some skilled in the art distinguish between a "vulnerability" and an "exposure"—an exposure being remedied by reconfiguring the product, and vulnerability being remedied only by revising (e.g., recoding) the product—in this application, "vulnerability" is defined broadly to encompass both of these categories of exploitable weakness.

The event signature 110 is likewise input for a vulnerability mapper 118 of the manager module 100. The vulnerability mapper 118 uses the event type identified in the event signature 110 to identify the various known vulnerabilities that the event 102 can exploit. Furthermore, the vulnerability mapper 118 then maps these identified vulnerabilities to other vulnerabilities that are the same or similar as recognized according to other vulnerability classification and organizational schemes. These correspondences can be accessed from a vulnerability database 128 available to the manager 100. This list of possible vulnerabilities is the exploited vulnerabilities 120, which include all representations of the vulnerabilities that can be exploited by the event 102 across several classification schemes.

These vulnerability organization schemes include the Common Vulnerabilities and Exposures Project (CVE), BugTraq, and ArachNIDS, among others. Yet others may be developed in the future. While their approaches differ, each scheme identifies many of the same or similar vulnerabilities. Some may be more specific than others in describing a class of vulnerabilities. Some of the vulnerabilities are completely identical in nature, but are known by different names according to each scheme. The maps used by the vulnerability mapper 118 can be constructed by hand, or the process can be automated, for example, by scraping information published by the various schemes on the Internet about vulnerability similarities.

The set of exposed vulnerabilities 116 and the set of exploited vulnerabilities 120 are input for a threat detector 122 of the manager module 100. The threat detector 122 compares the exposed vulnerabilities 116 of the target asset gathered by the asset model retriever 112 to the vulnerabilities 120 exploited by the event 102. In one embodiment, a threat to the target asset is detected when any of the exposed vulnerabilities 116 of the target asset are found among the exploited vulnerabilities 120.

In one embodiment, if the event 102 is determined to be a threat by the threat detector 122, then the event 102 is prioritized by a threat prioritizer 124 of the manager module 100. The threat prioritizer 124 can attach a priority according to a scale—e.g., a scale of zero to ten—based on various factors. Prioritizing events 102 can aid busy network security professionals in selecting which security events 102 they should spend their time addressing, in what chronological order, and with what amount of resources.

In one embodiment, the threat prioritizer 124 determines the appropriate priority based, at least in part, on the reliability of the model of the target asset retrieved from the asset model database 114. This quantity, sometimes referred to as model confidence, can be based on the completeness of the model, the method used to create the model, and the age of the model. The age of the model refers to the time that has elapsed since the model was created or last updated.

In one embodiment, the threat prioritizer 124 determines the appropriate priority based, at least in part, on the relevance of the event 102 to the actual target asset. To do this, the existence and presence on the network, the actual operation, and the configuration of the target asset are all observed and taken into account. For example, if the target asset—or a target port on the target asset—is turned off or is otherwise unavailable, the event 102 is not relevant, even if it is detected to be a threat based on the asset model.

In one embodiment, the threat prioritizer 124 determines the appropriate priority based, at least in part, on the danger inherent in the event 102. For example, an unauthorized access might have lower inherent danger to a network than events indicating file deletion or data compromise. In one embodiment, the inherent dangers of each known event signature 110 are programmable by the user of the network security system.

In one embodiment, the threat prioritizer 124 determines the appropriate priority based, at least in part, on the importance of the target asset to the enterprise or the network. For example, a revenue generating asset—such as a server that serves content in lieu of payment—is more important that an administrative printer. This measure of asset criticality may also be programmable by the user of the security system, or it may be automatically measured based on various rules and inferences.

After the threat has been prioritized, the event 102 can go through further processing 126 by the manager, before being sent on to some other module, such as a display or storage module. In one embodiment, events 102 representing threats are displayed along with their priority ranking and stored in a mass storage unit for further analysis.

Figure 2:
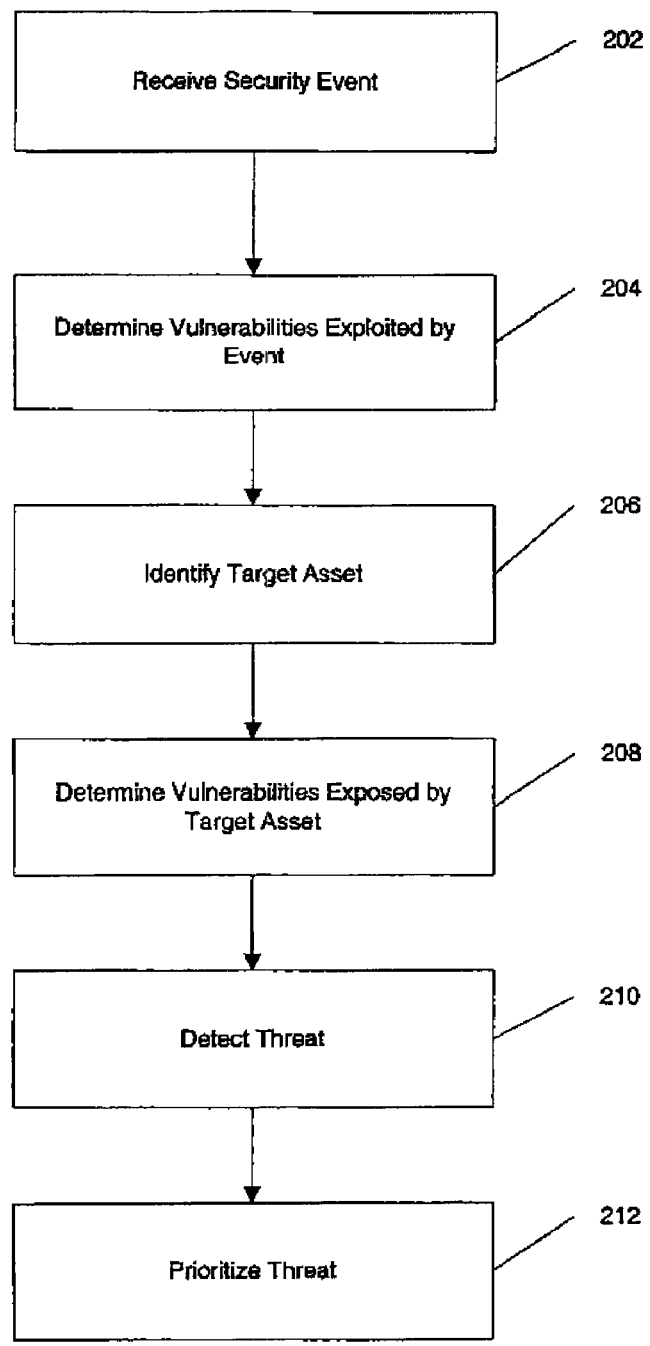
FIG. 2 is a flow diagram illustrating security event processing in accordance with one embodiment of the present invention.

FIG. 2 provides a flow-chart of event processing according to one embodiment of the invention. In block 202, a security event is received by the manager module. For example, event received may be "Enterasys, Dragon, IIS:CODE-RED-II-ROOT.EXE, 10.10.10.1" indicating that the Dragon sensor software by Enterasys (sensor product manufacturer and sensor product) has detected a version of the CodeRed attack (event type) aimed at a device with IP address "10.10.10.1" (target address). The first three fields can be referred to collectively as the event signature.

Next, in block 204, the vulnerabilities exploited by the event are determined. In the specific example above, for example, it can be determined that the CodeRed event can exploit the vulnerability CA-2001-19, as identified by the Computer Emergency Response Team (CERT) standard. This vulnerability, according to the vulnerability database, can also be mapped to CVE-2001-0500, as identified by the Common Vulnerabilities and Exposures (CVE) standard. Thus, in this example, both of these vulnerabilities are included in the set of exploited vulnerabilities.

In block 206, the target asset is identified. In the specific example, the target IP address 10.10.10.1 can be used to identify the target asset as a server running the IIS software. After the target asset is identified, in block 208, the vulnerabilities exposed by the target asset are determined. For example, the asset model for the server may indicate that it is vulnerable to CVE-2001-0500.

One reason that the vulnerability initially associated with the event had a CA number and the exposed vulnerability in the asset model has a CVE number can be that the sensor product—where the event/exploited vulnerability pair is determined from—may be by a different manufacturer that uses a different standard than the scanner used to populate the asset model. Vulnerability mapping across organizational standards can overcome this nomenclature problem. In one embodiment, the mapping does not aim to map all vulnerabilities to a common standard or scheme. Rather, the mapping are across multiple standards to include the most names for a given vulnerability.

When both the exploited and exposed vulnerabilities are determined, a threat is detected, in block 210, by comparing the two sets of vulnerabilities and looking for overlaps. In the example above, the event exploits vulnerability CVE-2001-0500, which is also exposed by targeted server. Therefore, the event received in block 202 would be classified as a threat in block 210.

In one embodiment, the event representing the threat is also prioritized. For example, in the case of the target server, it may be determined that it is currently turned off, that the asset model is out of date, or that it is of little value to the enterprise. Based on such information, the event received in block 202 can be considered a low priority threat. If, on the other hand, the target server were a revenue-generating server that is in operation, the priority of the received event would be much higher.

Thus, a manager module of a network security system, and event processing by the manager module, has been described. In the foregoing description, various specific intermediary values were given names, such as "event signature," and various specific modules, such as the "asset model retriever," have been described. However, these names are merely to describe and illustrate various aspects of the present invention, and in no way limit the scope of the present invention. Furthermore, various modules, such as the manager module 100 and the vulnerability mapper 118 in FIG. 1, can be implemented as software or hardware modules, or without dividing their functionalities into modules at all. The present invention is not limited to any modular architecture, whether described above or not.

In the foregoing description, the various examples and embodiments were meant to be illustrative of the present invention and not restrictive in terms of their scope. Accordingly, the invention should be measured only in terms of the claims, which follow.

The invention claimed is:

1. A computer-implemented method performed by a manager module for determining whether a security event represents a threat to a network, the method comprising:
   receiving the security event from an agent, the security event including an indication of a target asset;
   determining a first set of one or more vulnerabilities exploited by the received security event;
   determining a second set of one or more vulnerabilities exposed by the target asset; and
   detecting a threat by determining a vulnerability common to the first set of vulnerabilities and the second set of vulnerabilities.

2. The method of claim 1, further comprising:
   if no common vulnerability is shared by both the first set of vulnerabilities and the second set of vulnerabilities, determining that the security event does not represent the threat to the network.

3. The method of claim 1, further comprising prioritizing the security event.

4. The method of claim 3, wherein prioritizing the security event comprises determining a priority based on the security event.

5. The method of claim 4, wherein determining the priority based on the security event comprises determining the priority based on an importance of the target asset.

6. The method of claim 4, wherein determining the priority based on the security event comprises determining the priority based on a danger inherent in the security event.

7. The method of claim 4, wherein determining the priority based on the security event comprises determining the priority based on a relevance of the security event.

8. The method of claim 4, wherein determining the priority based on the security event comprises determining the priority based on a configuration of the target asset.

9. The method of claim 1, wherein the indication of the target asset comprises an address associated with the target asset.

10. The method of claim 9, wherein the address associated with the target asset comprises an Internet Protocol (IP) address.

11. The method of claim 1, wherein the target asset comprises a network device.

12. The method of claim 1, wherein determining the first set of vulnerabilities comprises determining the first set of vulnerabilities based on an event signature of the security event.

13. The method of claim 1, wherein determining the first set of vulnerabilities comprises determining the first set of vulnerabilities based on a type of the security event.

14. The method of claim 1, wherein determining the second set of vulnerabilities comprises determining the second set of vulnerabilities based on a model of the target asset.

15. The method of claim 14, further comprising determining a priority based on a reliability of the model of the target asset.

16. A machine-readable medium having stored thereon data representing instructions that, when executed by a processor in a manager module, cause the processor to perform a method for determining whether a security event represents a threat to a network, the method comprising:
   receiving the security event from an agent, the security event including an indication of a target asset;
   determining a first set of one or more vulnerabilities exploited by the received security event;
   determining a second set of one or more vulnerabilities exposed by the target asset; and
   detecting a threat by determining a vulnerability common to the first set of vulnerabilities and the second set of vulnerabilities.

17. A system for determining whether a security event represents a threat to a network, the system comprising:
   a machine-readable medium storing machine-readable instructions for performing a method, the method comprising:
      receiving the security event from an agent, the security event including an indication of a target asset;
      determining a first set of one or more vulnerabilities exploited by the received security event;
      determining a second set of one or more vulnerabilities exposed by the target asset; and
      detecting a threat by determining a vulnerability common to the first set of vulnerabilities and the second set of vulnerabilities; and
   a processor configured to execute the machine-readable instructions stored by the machine-readable medium.

18. The machine-readable medium of claim 16, wherein the method further comprises:
   if no common vulnerability is shared by both the first set of vulnerabilities and the second set of vulnerabilities, determining that the security event does not represent the threat to the network.

19. The machine-readable medium of claim 16, wherein the method further comprises determining a priority based on the security event.

20. The machine-readable medium of claim 16, wherein the indication of the target asset comprises an address associated with the target asset.

21. The machine-readable medium of claim 16, wherein determining the first set of vulnerabilities comprises determining the first set of vulnerabilities based on an event signature of the security event.

22. The machine-readable medium of claim 16, wherein determining the first set of vulnerabilities comprises determining the first set of vulnerabilities based on a type of the security event.

23. The machine-readable medium of claim 16, wherein determining the second set of vulnerabilities comprises determining the second set of vulnerabilities based on a model of the target asset.

24. The system of claim 17, wherein the method further comprises:
   if no common vulnerability is shared by both the first set of vulnerabilities and the second set of vulnerabilities, determining that the security event does not represent the threat to the network.

25. The system of claim 17, wherein the method further comprises determining a priority based on the security event.

26. The system of claim 17, wherein the indication of the target asset comprises an address associated with the target asset.

27. The system of claim 17, wherein determining the first set of vulnerabilities comprises determining the first set of vulnerabilities based on an event signature of the security event.

28. The system of claim 17, wherein determining the first set of vulnerabilities comprises determining the first set of vulnerabilities based on a type of the security event.

29. The system of claim 17, wherein determining the second set of vulnerabilities comprises determining the second set of vulnerabilities based on a model of the target asset.

* * * * *